United States Patent
Asahara et al.

(10) Patent No.: US 8,192,662 B2
(45) Date of Patent: Jun. 5, 2012

(54) PROCESSES FOR PRODUCING PERFORM AND FRP

(75) Inventors: Nobuo Asahara, Ehime (JP); Hiroshi Odani, Ehime (JP); Eisuke Wadahara, Ehime (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 12/461,377

(22) Filed: Aug. 10, 2009

(65) Prior Publication Data

US 2009/0301641 A1  Dec. 10, 2009

Related U.S. Application Data (62) Division of application No. 10/594,614, filed as application No. PCT/JP2005/005864 on Mar. 29, 2005, now abandoned.

(30) Foreign Application Priority Data

Mar. 30, 2004  (JP) .................................. 2004-098102

(51) Int. Cl.
B28B 1/48 (2006.01)
(52) U.S. Cl. .......................... 264/156; 264/258; 156/253
(58) Field of Classification Search .................. 264/156, 264/258; 156/253
See application file for complete search history.

(56) References Cited

U.S. PATENT DOCUMENTS

| 4,786,541 | A |   | 11/1988 | Nishimura et al. ........... 428/102 |
| 4,990,207 | A |   | 2/1991 | Sakai et al. ................... 156/242 |
| 5,047,288 | A | * | 9/1991 | Hoshiro et al. ............... 428/219 |
| 5,126,091 | A | * | 6/1992 | Melton .......................... 264/257 |
| 5,246,520 | A | * | 9/1993 | Scanlon et al. ............... 156/245 |
| 6,106,646 | A | * | 8/2000 | Fairbanks ..................... 156/73.3 |
| 2002/0053400 | A1 |   | 5/2002 | Lorenz et al. ............... 156/309.3 |
| 2003/0136502 | A1 | * | 7/2003 | Lavasserie et al. .......... 156/253 |
| 2004/0170554 | A1 |   | 9/2004 | Wadahara et al. ......... 423/447.2 |
| 2004/0247845 | A1 |   | 12/2004 | Abe et al. |

FOREIGN PATENT DOCUMENTS

| GB | 2 323 056 A | 9/1998 |
| JP | 2003-39429 A | 2/2003 |
| JP | 2003-80607 A | 3/2003 |
| WO | 99/46095 | 9/1999 |
| WO | 03/013817 | 2/2003 |

* cited by examiner

Primary Examiner — Joseph Del Sole
Assistant Examiner — David N Brown, II
(74) Attorney, Agent, or Firm — Kubovcik & Kubovcik

(57) ABSTRACT

A preform, formed with a plurality of reinforcing fiber substrates stacked to each other and each made of at least reinforcing fiber yarns, has a resin material, whose main component is a thermoplastic resin, interlaminated between the layers of the reinforcing fiber substrates in the preform, and has through holes extending through a plurality of the reinforcing fiber substrates in the thickness direction of the preform; an FRP molded using this preform; and processes for producing these. By improving the impregnability in the thickness direction of the preform, an FRP excellent both in various mechanical properties and in matrix resin impregnation and stabler in quality can be produced with high productivity.

5 Claims, 4 Drawing Sheets

PROCESSES FOR PRODUCING PERFORM AND FRP

This application is a division of application Ser. No. 10/594,614, filed Sep. 28, 2006 now abandoned, which is a 371 of international application PCT/JP2005/005864 filed Mar. 29, 2005, which claims priority based on Japanese Patent Application No. 2004-098102, filed Mar. 30, 2004, which is incorporated herein by reference.

TECHNICAL FIELD OF THE INVENTION

The present invention relates to a preform used for molding of a fiber reinforced plastic (hereinafter, referred to as "FRP"), an FRP obtained from the preform, and processes for producing these. More specifically, the present invention relates to a preform excellent in impregnability of matrix resin and capable of obtaining an FRP exhibiting high mechanical properties and stable in quality, an FRP obtained therefrom, and processes for producing these.

BACKGROUND ART OF THE INVENTION

As a material light in weight and high in strength, an FRP is paid attention to in various industrial fields, and in particular, a carbon fiber reinforced plastic (CFRP) is paid attention to from the viewpoint of its excellent mechanical properties, etc. Especially, in the air plane field, the application part of an FRP is being enlarged, and it is a material expected with a further development in the future.

In a fiber reinforced plastic whose reinforcing fibers are continuous carbon fibers, although the mechanical properties in the plane of fiber axes are excellent, if an impact is partially applied to a CFRP plate, stacked with carbon fiber sheets, in its thickness direction, there is a case where a crack is generated between the layers in the CFRP plate by the impact and the layers are broken away from each other at the interlaminar portion, and therefore, various methods for strengthening the interlaminar portion have been proposed.

In an FRP using such a CFRP plate, as the typical production method thereof, usually a preform, in which reinforcing fiber substrates are stacked in a form of an FRP to be molded in advance, is used, but there are the following problems when a matrix resin is injected and the FRP is molded. Namely, since generally an impregnation speed of a matrix resin into a preform greatly depends on a porosity of the preform (a rate of pores in a preform), in a condition where a reinforcing fiber volume content (a bulk density) is high (so-called "near net shape"), the impregnation speed becomes low because of its small porosity. Further, even in a condition of same porosity, there is a characteristic in that the impregnation speed in the plate thickness direction is much lower than that in the direction in plane of reinforcing substrate. Therefore, in the injection molding of CFRP, particularly when a near net shape molding or a molding of a thick plate is carried out, because the impregnation speed into the preform is low, the cycle time for molding becomes long, there is a problem that the productivity becomes low, and as the worst case, there is a problem that the impregnation is not completed within a time of a pot life of the resin, and a non-impregnated portion is left in the molded product.

As the method for reinforcing the interlaminar portion between the substrate layers, as shown in Patent Document 1, there is a method for adding a resin material whose main component is a thermoplastic resin to the interlaminar portion between the reinforcing fiber layers in the preform, thereby increasing the strength of the interlaminar portion. Since this resin material has not only an advantage of reinforcing the interlaminar portion but also a function of bonding and fixing the reinforcing fiber substrates to each other in the preform, it is a very effective material also for the production of the preform.

With respect to the porosity of this preform, however, in comparison with a usual reinforcing fiber substrate provided with no resin material at a same reinforcing fiber volume content, because the porosity of the preform becomes small by an amount corresponding to the volume of the resin material in the preform, there is a problem that the impregnability is poor. Further, in a condition where the reinforcing fiber volume content (the bulk density) of the preform is particularly high, because there is a case where the interlaminar portion becomes thinnest, that is, becomes a film-like state even if any form of resin material is employed, there is a problem that the resin material present in the interlaminar portion obstructs the matrix resin flowing in the plate thickness direction to be impregnated into the reinforcing fiber layers. Namely, although the preform is very excellent in various mechanical properties, particularly in a case where a molding at a high reinforcing fiber volume content, that is, a molding at a so-called near net shape condition, is carried out, or in a case where a thick preform is molded, there is a problem that much time is required in the impregnation process of the matrix resin.

Further, as described in Patent Document 2, there is also a method wherein reinforcing fibers are raised by needle punching, the raised yarn fibers or short fiber webs are pressed into the portion between layers, and the shear strength and the antiplane strength of the interlaminar portion is increased by a condition where the layers are bridged to each other. In this method, the impregnability in the plate thickness direction is increased by the capillarity of the raised fibers, and the interlaminar strength can be increased by the anchor effect due to the raised fibers. In this method, however, because the raising is carried out by daring to cut a part of reinforcing fibers at the time of needle punching, the strength decreases by the amount corresponding to the cut fibers. Further, because a stress concentration is liable to occur at the punched portion, although there is an advantage for increasing the interlaminar strength, as its side effect, there is a problem that the basic mechanical properties such as a tensile strength and a compressive strength in one direction depending on the amount of reinforcing fibers are decreased.

Patent Document 1: JP-A-2003-80607
Patent Document 2: JP-A-2003-39429

DISCLOSURE OF THE INVENTION

Problems to be Solved by the Invention

An object of the present invention is to solve the above-described problems in the conventional technologies and to provide an FRP excellent in both various mechanical properties and impregnability of matrix resin and stabler in quality, a perform used therefor, and processes capable of producing these with a high productivity, by improving the impregnability in a plate thickness direction of a preform.

Means for Solving the Problems

To achieve the above-described object, the present invention employs the following respective means.

A preform according to the present invention is formed with a plurality of reinforcing fiber substrates stacked to each other and each made of at least reinforcing fiber yarns, and comprises through holes which extend through a plurality of the reinforcing fiber substrates in a thickness direction of the preform.

Further, a preform according to the present invention is formed with a plurality of reinforcing fiber substrates stacked to each other and each made of at least reinforcing fiber yarns, and comprises a resin material, whose main component is a thermoplastic resin, interlaminated between layers of the reinforcing fiber substrates in the preform, and through holes which extend through a plurality of the reinforcing fiber substrates in a thickness direction of the preform.

Further, an FRP according to the present invention is molded by impregnating a matrix resin into the above-described preform and curing the resin.

Further, a process for producing a preform according to the present invention comprises a stacking step for forming a plurality of reinforcing fiber substrates each made of at least reinforcing fiber yarns and stacking a plurality of these substrates in a preform mold, and a penetrating step for forming through holes which extend through a plurality of the reinforcing fiber substrates in a thickness direction of a stacked body.

For example, in a process for producing a preform according to a first embodiment of the present invention, the preform is produced by at least the following steps (A) to (E) carried out in order:
- (A) a stacking step for forming a plurality of reinforcing fiber substrates each made of at least reinforcing fiber yarns and stacking a plurality of these substrates in a preform mold,
- (B) a disposing step for disposing a stacked body, formed by the stacking step, in a preform mold,
- (C) a heating step for heating the stacked body and bonding respective layers, each comprising a reinforcing fiber substrate and a resin material, at least partially,
- (D) a cooling step for cooling the stacked body, and
- (E) a penetrating step for forming through holes which extend through a plurality of the reinforcing fiber substrates in a thickness direction of the preform.

Further, in a process for producing a preform according to a second embodiment of the present invention, the preform is produced by at least the following steps (F) to (K) carried out in order:
- (F) a stacking step for forming a plurality of reinforcing fiber substrates each made of at least reinforcing fiber yarns and stacking a plurality of these substrates in a preform mold,
- (G) a penetrating step for stacked body for penetrating a plurality of the reinforcing fiber substrates with a needle or a pin in a thickness direction of a stacked body formed by the stacking step,
- (H) a disposing step for disposing the stacked body in a preform mold,
- (I) a heating step for heating the stacked body and bonding respective layers, each comprising a reinforcing fiber substrate and a resin material, at least partially,
- (J) a cooling step for cooling the stacked body, and
- (K) a removing step for removing the needle or the pin.

Furthermore, a process for producing an FRP by using the aforementioned preform and by at least the following steps (L) to (N):
- (L) a setting step for disposing the preform in a mold,
- (M) an injecting step for injecting a liquefied matrix resin into the mold to impregnate the matrix resin into the preform, and
- (N) a curing step for curing the matrix resin.

Effect According to the Invention

In the preform, the FRP, and the processes for producing these according to the present invention, an FRP excellent in both various mechanical properties and impregnability of resin at the time of molding and stable in quality can be obtained at a high productivity.

EXPLANATION OF SYMBOLS

1: preform
2: reinforcing fiber layer
3: resin material
4: through hole
5: sealant
6: vacuum pump
7: bagging material
8, 8a: bleeding material
8b: exhaust line
9: pressing plate
41: stepped portion (pad up portion)
42: thin portion
61: FRP
71: preform mold
72: through mold
81: needle for penetrating
82: protection plate
91: pin
92: pressing plate with pins
101: resin pot
102: resin injection port
103: mold
104: peel ply
105: resin distributing medium

THE BEST MODE FOR CARRYING OUT THE INVENTION

Hereinafter, desirable embodiments of the present invention will be explained referring to figures.

Figure 1:
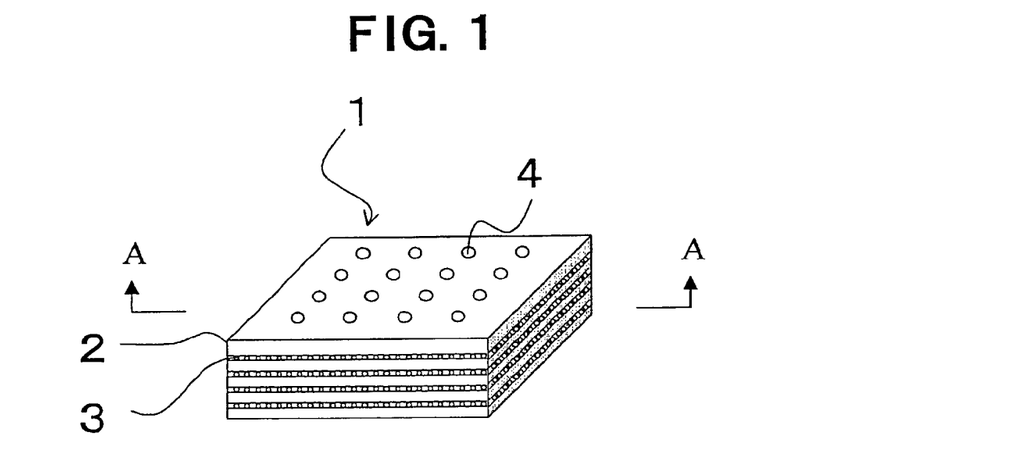
FIG. 1 is a perspective view of a preform according to an embodiment of the present invention.
Figure 2:
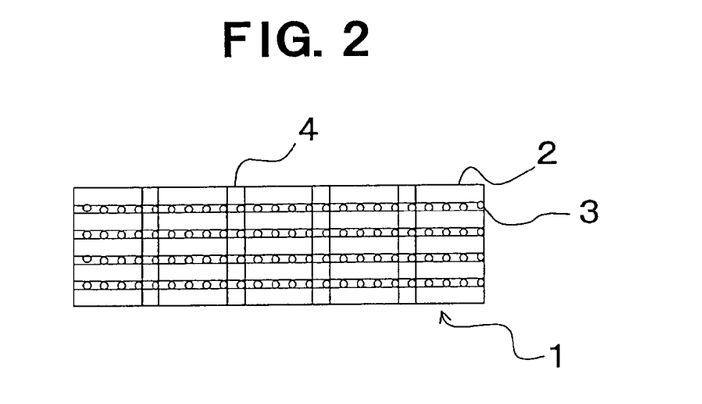
FIG. 2 is a sectional view of the preform depicted in FIG. 1, as viewed along line A-A of FIG. 1.
Figure 3:
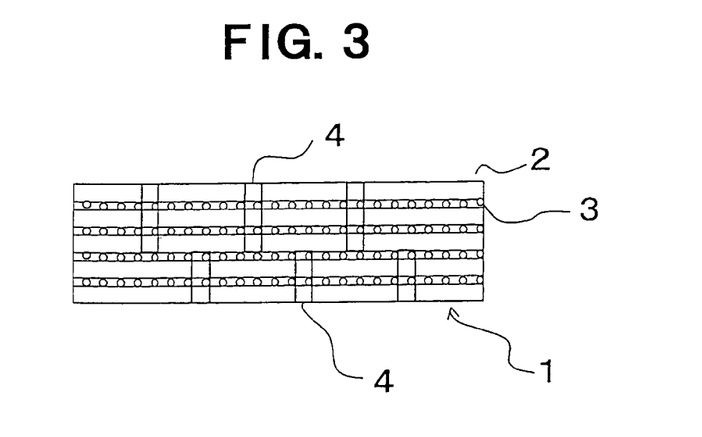
FIG. 3 is a sectional view of a preform according to a modification of the embodiment depicted in FIG. 2.

FIG. 1 is a perspective view of a preform according to an embodiment of the present invention, FIG. 2 is a sectional view of the preform depicted in FIG. 1, as viewed along line A-A of FIG. 1, and FIG. 3 is a sectional view of a preform according to a modification of the embodiment depicted in FIG. 2.

In FIG. 1, a preform 1 according to an embodiment of the present invention is formed by stacking a plurality of reinforcing fiber substrates 2 each of which is formed by arranging continuous yarns of reinforcing fibers such as carbon fibers or aramide fibers in parallel to each other (the details will be described later). The point characterized by the present invention of the preform according to the present invention is in that through holes 4 extending through at least a plurality of reinforcing fiber substrates 2 in the thickness direction of preform 1 are provided to the preform 1.

As shown in FIG. 2, it is preferred that these through holes 4 extend up to the back surface through preform 1 in the plate thickness direction of the preform 1, in order to ensure the flow path of a matrix resin in the plate thickness direction at the time of molding. Further, from the viewpoint of dispersing stress concentration, as shown in FIG. 3, it may be structured such that the through holes are formed so as to penetrate a part of the plurality of reinforcing fiber substrates 2, and a plurality of through holes 4 provided at other positions extend up to the back surface through the remaining reinforcing fiber substrates 2.

Further, it is preferred that the reinforcing fibers present at the inner circumferential surfaces of through holes 4 substantially are not cut. This is because, by the condition where the reinforcing fibers present around the through holes substantially are not cut, it becomes possible to exhibit the properties of a molded product more efficiently. Where, the condition of substantially being not cut will be explained. For example, in a case where reinforcing fibers are intentionally cut such as a case where a needle with a reverse part is penetrated into a reinforcing fiber substrate, the cut fibers bend around through holes or in the through holes and the orientation of the fiber parts near cut ends is changed to the extending direction of the through holes. However, the condition where the fibers substantially are not cut means a degree that, even if a part of reinforcing fibers are cut, the above-described rapid change of orientation is not observed around the holes.

Although the size, shape and pitch of through holes 4 are not particularly limited as long as a matrix resin can enough flow in the plate thickness direction and desired mechanical properties of a molded product can be achieved, it is preferred that concretely the through holes 4 are set in consideration of the following points from the viewpoints of the impregnability depending upon used reinforcing fiber substrates and matrix resin, and the strength required for an FRP.

In a case where the size of through holes 4 is set large, there is a possibility that the hole becomes a resin-rich portion when molded as an FRP and there occurs a stress concentration. Further, as is well known, because the strength of an FRP depends on the orientation angle of fibers, as the diameter of the through hole 4 in the direction perpendicular to the main axis of the reinforcing fibers becomes greater, the local orientation angle of the fibers changes and the influence to the strength becomes greater, and therefore, it is preferred that the size of the through holes is set as small as possible within a range in size in which a matrix resin can be enough impregnated. For example, when a gap between the fibers at a position of a through hole is referred to as a short axis of an oval corresponding to the through hole, it is preferred that the length of the short axis is in a range of 0.1 to 3 mm.

The shape of through hole 4 is not particularly limited as long as the aforementioned function is satisfied. From the viewpoint of making the local aberration of the orientation angle small, the diameter in the direction perpendicular to the main axis of the reinforcing fibers is preferably set small, and for example, the shape may be an oval.

The pitch of through holes 4 is preferably set in consideration of the used reinforcing fiber substrates and matrix resin, the shape and size of through hole 4, etc. For example, the pitch is preferably set so that the matrix resin flowed into through holes 4 can expand in the plane direction of reinforcing fiber substrates 2 and the resin can be impregnated into the whole of the reinforcing fiber substrates 2 from a plurality of through holes 4. The flow condition of the resin will be described in detail in the description of the production process.

Where, it is preferred that the reinforcing fibers of the respective layers of the reinforcing fiber substrates are fixed in their fabric style, because such through holes can exist stably and they are hardly affected by vibration, change with the passage of time, etc. The fixing in fabric style means to restrict the collection form of single fibers in the reinforcing fiber substrate, for example, by applying a thin film-like resin liquefied or soft at a room temperature onto at least one surface of the reinforcing fiber substrate, or by heat fusing a thermoplastic resin non-woven fabric or scattered particles or the like, which is low in weight per unit volume, onto at least one surface of the reinforcing fiber substrate. The material and formation employed for fixing in fabric style are not limited to those described above as long as the through holes can be thus stabilized, and thermosetting resins, thermoplastic resins, etc. can be used appropriately.

In the present invention, as shown in FIGS. 1 to 3, it is preferred that a resin material 3 (the detail thereof will be described later), whose main component is a thermoplastic resin, is interlaminated between the respective layers of the reinforcing fiber substrates. As aforementioned, by disposing the resin material between the layers, in addition to an effect for increasing the interlaminar strength, the resin exhibits an effect as an agent for fixing in fabric style, and because a function for keeping the shape of through holes can be given, a better advantage according to the present invention can be exhibited.

It is preferred that the volume content of reinforcing fibers Vpf of preform 1 according to the present invention is in a range of 45 to 62%. Since generally the impregnability of matrix resin into reinforcing fibers depend on the porosity of preform 1, ultimately, the volume content of the reinforcing fibers, the advantage according to the present invention can be highly exhibited particularly in a region with a high volume content of reinforcing fibers. If the volume content of reinforcing fibers Vpf is less than 45%, because the porosity in the preform 1 is high, the effect due to through hole 4 becomes small. On the other hand, if the volume content of reinforcing fibers Vpf is more than 62%, the production becomes difficult. Further, as to the relation with the volume content of reinforcing fibers Vf of an FRP, the Vpf is preferably in a range of $Vf-5 \leqq Vpf \leqq Vf+5$.

The present invention is applied to a so-called near net shape preform because the advantage according to the present invention can be exhibited more greatly.

As the reinforcing fiber substrate used in the present invention, a woven fabric (unidirectional, bidirectional and multiaxial), a knit fabric, a braid, a sheet arranged in one direction (a unidirectional sheet) or a multiaxial sheet formed by superposing two or more unidirectional sheets (hereinafter, these woven fabric, sheets, etc. are referred to "a fabric" as a generic term), whose reinforcing fibers are inorganic fibers such as carbon fibers or glass fibers or organic fibers such as polyamide or aramide fibers, can be raised. These fabrics may be formed by integrating a plurality of layers by various bonding means such as a stitch yarn, a knot yarn, a sheeting, a binder, etc. The unidirectional sheet as such a reinforcing fabric is a sheet in which the reinforcing fiber yarns are stabilized in form at a condition being arranged in one direction by a resin material or other means.

The unidirectional sheet as such a reinforcing fabric may has a weave structure in which the reinforcing fiber yarns are arranged in the lengthwise direction, that is, the longitudinal direction, of the reinforcing fabric, and auxiliary yarns thinner than the reinforcing fiber yarns are arranged in the transverse direction to be across the reinforcing fiber yarns. The bidirectional sheet as such a reinforcing fabric has a weave structure in which the reinforcing fiber yarns are arranged in longitudinal and transverse directions to be across each other.

A multiaxially stitched substrate as such a reinforcing fabric is formed, for example, by forming $+\alpha°$ layer by arranging the reinforcing fiber yarns in parallel to each other in $+\alpha°$ direction relative to the longitudinal direction as a lower layer, then forming 90° layer by arranging the reinforcing fiber yarns in parallel to each other in the transverse direction, then forming $-\alpha°$ layer by arranging the reinforcing fiber yarns in parallel to each other in $-\alpha°$ direction relative to the longitudinal direction, then forming 0° layer by arranging the reinforcing fiber yarns in parallel to each other in the longitudinal direction, and at a condition where these four layers having orientation directions different from each other are stacked, integrating them by stitching them with stitch yarns. Although four layer structure of $+\alpha°/90°/-\alpha°/0°$ layers is explained here as the reinforcing fiber structure of the multiaxially stitched substrate, the structure is not limited thereto.

As the organic fiber fabric, for example, there are a nonwoven fabric, a net, a mesh, a woven fabric, a knit fabric, a short fiber aggregate, etc., and these may be combined. The resin material 3 is preferably bonded to the reinforcing fiber substrate 2.

The form of resin material 3 is not particularly limited as long as the resin can have a function increasing the interlaminar strength of reinforcing fibers and an adhesive property between reinforcing fiber substrates 2. As the form of resin material 3, for example, a form of a particle, an organic fiber fabric or a film can be used. From the viewpoints of increasing the reinforcing fiber volume content in the preform and having various kinds of thermoplastic resins capable of being used, the form of particle is preferable, and the mean particle diameter is preferably in a range of 1 to 500 μm.

In a case where resin material 3 is a thermoplastic resin, it is possible to control the reinforcing fiber volume content Vpf of the preform by changing the plate thickness by releasing the restriction of the reinforcing fiber substrate 2 due to the resin material 3 by heating/pressing the preform 1, and restricting the reinforcing fiber substrate 2 with the resin material 3 by cooling/removing the pressure at a required plate thickness.

As such a thermoplastic resin, a resin good in affinity with a matrix resin can be selected. For example, polyamide, polyimide, polyamideimide, polyetherimide, polysulfone, polyethersulfone, polyphenyleneether, polyethernitrile, polyetheretherketone, polyetherketoneketone, modified resin and copolymer thereof, etc. can be used. Further, it is preferred that such a resin material 3 in a condition of a low glass transition point at the time of the form of a preform, and in a condition of a high glass transition point after being molded as an FRP, from the viewpoint of making the preform 1. For example, a sub component such as a thermosetting resin other than the thermoplastic resin can be contained.

From the viewpoint of controlling the reinforcing fiber content of the preform, it is preferred that the resin material 3 is provided at a range of 1 to 20% by weight relative to the preform 1. If the content of the resin material 3 is less than 1% by weight, the advantage for increasing the interlaminar strength is small, and there is a problem that the control range of the reinforcing fiber volume content of the preform 1 is narrow. Further, if the content of the resin material 3 is more than 20% by weight, the volume of the resin material 3 becomes large, and it causes a problem that the reinforcing fiber volume content cannot be controlled to be high. Where, the reinforcing fiber volume content Vpf of the preform 1 in the present invention means a value determined by the following equation. The symbols used here are as follows. The preform subjected to the determination is one in which the spring back of the preform is substantially saturated.

$$Vpf=(W1\times100)/(\rho\times T1)(\%)$$

Where,

W1: weight of reinforcing fibers per 1 cm³ of preform (g/cm³)

ρ: density of reinforcing fibers (g/m²)

T1: plate thickness of preform measured under a load of 1 atm (cm)

Next, a modification of the preform according to the present invention will be explained referring to figures.

Figure 4:
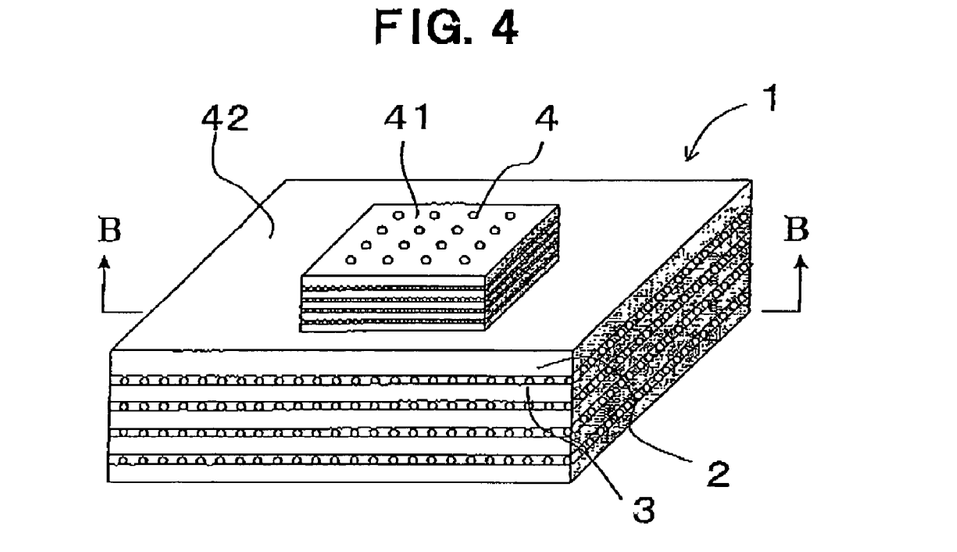
FIG. 4 is a perspective view of a preform according to another embodiment of the present invention.
Figure 5:
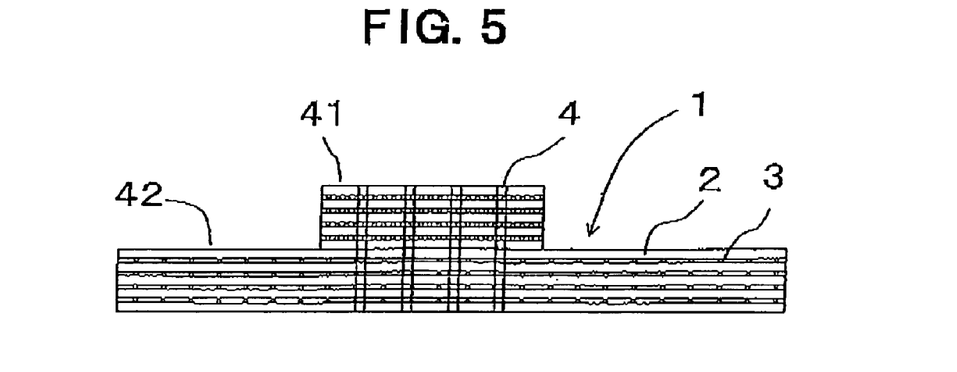
FIG. 5 is a sectional view of the preform depicted in FIG. 4, as viewed along line B-B of FIG. 4.

FIG. 4 is a perspective view of a preform according to a modification of FIG. 1 different from the embodiment depicted in FIG. 1, and FIG. 5 is a a sectional view of the preform depicted in FIG. 4, as viewed along line B-B of FIG. 4.

As shown in FIGS. 4 and 5, in the preform according to this modification, on the preform 1 shown in FIG. 1, a stepped portion 41 different in outer dimension of reinforcing fiber substrates and number of stacking thereof is provided, namely, a preform as a pad up portion 41 is provided on a thin portion 42. For the preform of this modification, through hole may be provided over the whole of the preform, and as shown in FIGS. 4 and 5, through holes 4 extending up to the back surface may be provided locally. In the conventional technology, in a case of preform 1 having such a pad up portion 41, for example, at the time of injection molding of a resin, because the distances in the plate thickness direction, at which the matrix resin is impregnated, are different from each other in the plane of the preform, the time for impregnating the resin into the pad up portion 41 has been much longer as compared with the time in the thin portion 42.

Therefore, in a case where the time exceeds the pot life of the resin during the impregnation in the pad up portion 41, or a case where the communication between the reinforcing fibers in the pad up portion 41 and a vacuum lime is interrupted by the matrix resin previously impregnated into the thin portion 42 and the vacuum pressure cannot be maintained, a case has frequently occurred wherein a non-impregnated portion is left after molding. In the preform 1 according to the present invention, however, such a problem does not occur because the matrix resin charged into through holes 4 is immediately entered and impregnated in the plane direction of the respective substrates 2. As aforementioned, the through holes 4 may be provided over the entire surface of the preform 1, and from the viewpoint of decreasing the resin-rich portions formed in the through holes, it is effective to locally provide the through holes 4 only in the pad up portion 41. Further, it is possible to make the impregnation time of matrix resin of the pad up portion 41 equal to that of the thin portion 42 by appropriately changing the disposition and diameter of the through holes, and it is also possible to prevent the generation of non-impregnated portions by impregnation into the pad up portion 41 in advance.

Next, a desirable embodiment of an FRP using the preform according to the present invention will be explained referring to figures.

Figure 6:
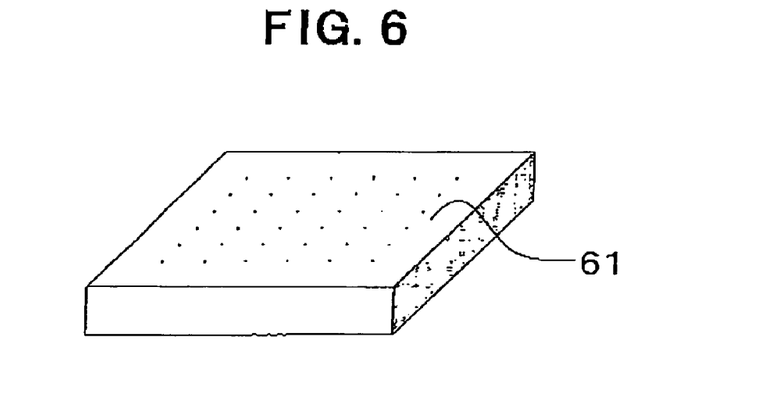
FIG. 6 is a perspective view of an FRP according to an embodiment of the present invention.

FIG. 6 is a perspective view of an FRP according to an embodiment of the present invention, and this FRP 61 is molded by impregnating a matrix resin into the above-described preform 1 and curing it. As preferable examples of such a matrix resin, for example, a thermosetting resin, a thermoplastic resin for RIM, etc. can be raised, and in particular, at least one selected from the group of epoxy, vinylester, unsaturated polyester, cyanateester, bismaleimide and benzooxazine is preferred.

The volume content of reinforcing fibers Vf of such an FRP 61 is preferably in a range of 45 to 70% because the aforementioned advantage according to the present invention is highly exhibited. More preferably the volume content is in a range of 45 to 62%, and further preferably in a range of 50 to 60%. Where, the volume content of reinforcing fibers Vf means a value determined by the following equation (unit: %). The symbols used here are as follows.

$$Vf = (W2 \times 100)/(\rho \times T2)(\%)$$

Where,
W2: weight of reinforcing fibers per 1 cm² of FRP (g/cm²)
$\rho$: density of reinforcing fibers (g/cm³)
T2: thickness of FRP (cm)

The FRP with such a structure according to the present invention has excellent mechanical properties and it is light in weight, and therefore, it is suitable to be used as a primary structural member, a secondary structural member, an outer panel or an inner panel of transportation means of an airplane, an automobile or a ship.

Next, a process for producing a preform according to a first embodiment of the present invention will be explained.

Figure 7:
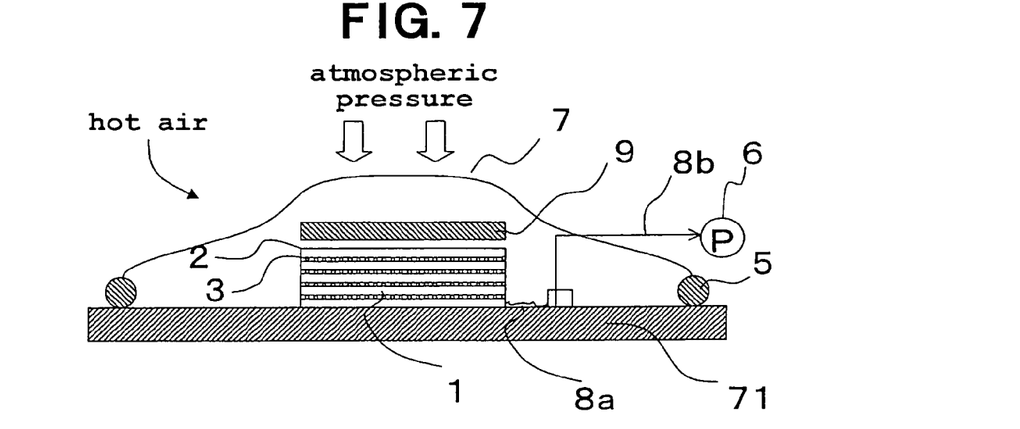
FIG. 7 is a schematic vertical sectional view of an apparatus for producing a preform, showing a process for producing a preform according to an embodiment of the present invention.
Figure 8:
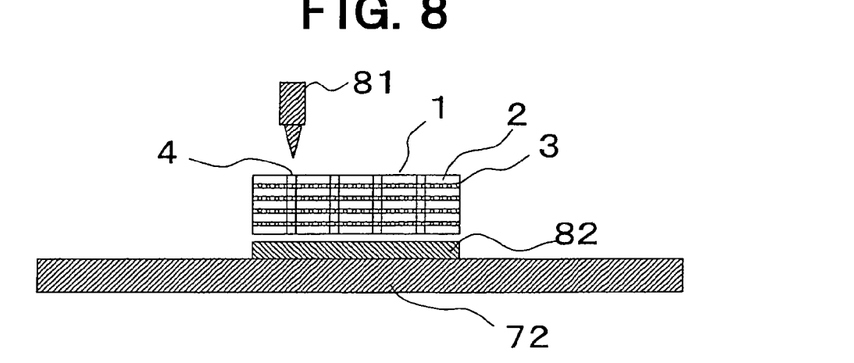
FIG. 8 is a schematic vertical sectional view of the apparatus, showing a next step following the step depicted in FIG. 7.

FIGS. 7 and 8 are schematic vertical sectional views of an apparatus for producing a preform, showing a process for producing a preform according to a first embodiment of the present invention, and among these figures, FIG. 7 is a sectional view showing the step of forming the preform and FIG. 8 is a sectional view showing the following penetrating step.

(A) Stacking Step:

As shown in FIG. 7, first, a plurality of reinforcing fiber substrates 2, each of which is made of reinforcing fiber yarns and has a resin material 3 whose main component is a thermoplastic resin on at least one surface, are stacked on a plate-like preform mold 71.

(B) Disposing Step:

Next, a pressing plate 9 is disposed on the reinforcing fiber substrates 2 placed on the preform mold 71, it is covered with a bagging material 7 from the upper side thereof, and the outer circumferential portion is closed by a sealant 5. Then, a bleeding material 8a is connected to the lowermost layer of reinforcing fiber substrate, and a vacuum pump 6 provided outside the system is communicated through an exhaust line 8b. Thereafter, by operating the vacuum pump 6 and reducing the pressure in the bagging material 7, the atmospheric pressure due to the pressure difference between the inside and the outside of the bagging material 7 is loaded to the whole of the preform 1, and the entire stacked body of the preform 1 is compressed onto the mold 71. Where, in the disposing step, the preform mold 71 may be structured so that one of molds forming the preform mold 71 is the bagging material 7 and the other is a male mold or a female mold, or may be structured from a male mold and a female mold without using a bagging material. Further, there is no problem even if the preform mold 71 is used as a mold for molding, and in a case of a large-sized FRP, it is preferred to use a mold capable of being used for both of preforming and molding in order to reduce the cost of the equipment. As the bagging material 7, for example, there are a film, a flexible rubber, etc., and as the preform mold 71, for example, a metal mold, a wooden mold, a resin mold, an FRP mold, etc. can be used.

(C) Heating Step:

Next, as shown in FIG. 7, by heating the whole of the preform 1 by, for example, hot air, the resin material 3 mainly made of a thermoplastic resin is softened, the thickness of the preform 1 is decreased, and the respective layers including the reinforcing fiber substrates 2 and the resin material 3 are partially bonded to each other.

Further, in this heating step, it is preferred to control the volume content of reinforcing fibers Vpf in a range of 45 to 62% by pressing the reinforcing fiber substrates 2. Although the method for pressing the preform 1 is not particularly limited, in particular, in a case where the bagging material 7 and a male mold or a female mold are used as the preform mold 71, a method for enclosing the stacked body in the preform mold 71 and pressing the preform 1 at an atmospheric pressure by reducing the pressure in the preform mold 71 down to an atmospheric pressure or less is preferred from the viewpoint of suppressing the cost of the equipment cheap. Further, in a case where the preform mold 71 is formed from a male mold and a female mold, a method for mechanically pressing the stacked body in the thickness direction thereof may be employed. The temperature for the heating is preferably in a range of 50 to 180° C. from the viewpoint of plasticizing the resin material, making the reinforcing fibers movable and controlling the preform at a desirable fiber volume content.

(D) Cooling Step:

Next, when the whole of the stacked body becomes a required thickness, at the cooling step, the whole of the preform 1 is cooled, the resin material 3 is solidified, and the reinforcing fiber substrates 2 are fixed.

(E) Penetrating Step:

Next, as shown in FIG. 8, at the penetrating step, through holes 4 extending through a plurality of reinforcing fiber substrates 2 are formed in the thickness direction of the preform 1 placed on a protection plate 82, using a needle for penetrating 81. Concretely, after the preform is cooled at the cooling step, the bagging material 7 and the pressing plate 9 are removed, and the preform 1 is replaced on a mold 72 via the protection plate 82. Then, the needle for penetrating 81 is inserted into the preform at an appropriate pitch until the tip reaches the protection plate 82. Where, it is also preferred that the needle for penetrating 81 is being heated.

Although the shape of the needle for penetrating 81 used in the penetrating step is not particularly limited, a shape hard to cut fibers and easy to be penetrated a gap between fibers is preferred from the viewpoint of the mechanical properties of FRP. For example, a needle, which has no reverse portion, no hole and no recessed portion so that the fibers are not cut, and the tip of which is processed in a round shape, can be used. In addition, as to the diameter of the needle for penetrating, the diameter of its short axis is preferably in a range of 0.1 to 3 mm, more preferably in a range of 0.1 to 2 mm, and the pitch is preferably in a range of 10 mm to 50 mm. Further preferably, the diameter of the needle for penetrating is in a range of 0.5 to 1.5 mm and the pitch is in a range of 10 mm to 40 mm.

Further, when the through hole is opened, a ultrasonic wave may be applied to the needle for penetrating. By applying a ultrasonic wave, without cutting surrounding fibers, the needle can be penetrated smoothly into the preform.

The protection plate 82 for protecting the needle for penetrating 81 may be made of a foamed material, or it is also preferred to open holes corresponding to the needle for penetrating 81 on the mold 72 as a through mold, in advance.

Figure 9:
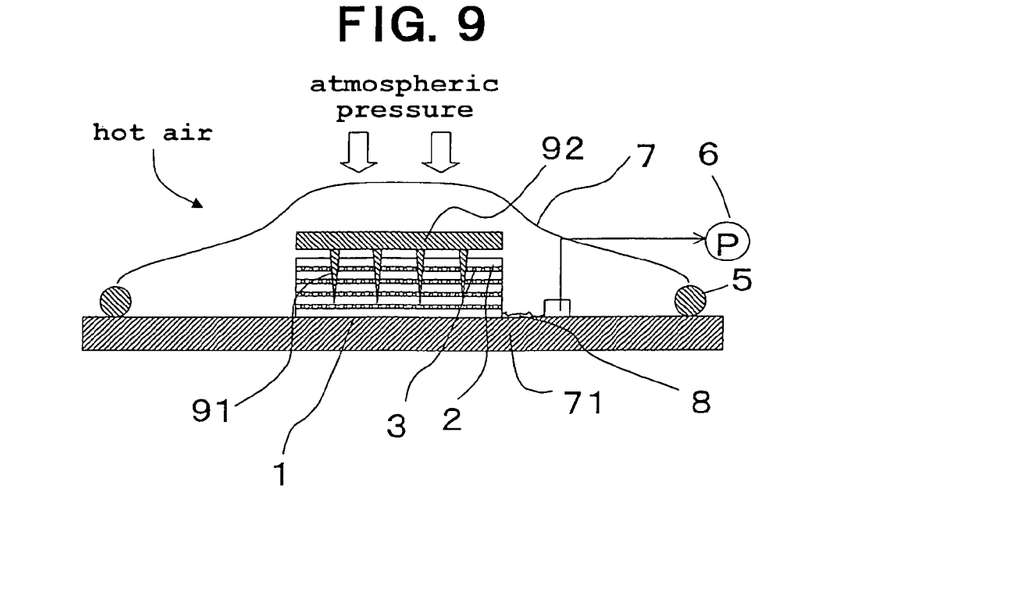
FIG. 9 is a schematic vertical sectional view of an apparatus for producing a preform, showing a process for producing a preform according to another embodiment of the present invention.

FIG. 9 shows a schematic section of an apparatus for producing a preform used in a process for producing a preform according to a second embodiment of the present invention, and shows a structure for explaining from a stacking step to a cooling step. Hereinafter, each step will be explained.

(F) Stacking Step:

First, similarly to in the above-described first embodiment, for the following penetrating step, a plurality of reinforcing fiber substrates 2, each made of at least reinforcing fiber yarns and having the resin material 3 whose main component is a thermoplastic resin on at least one surface, are stacked on the preform mold 71.

(G) Penetrating Step:

Next, a pressing plate 92 integrated with pins 91 is pressed onto the reinforcing fiber substrates 2 stacked on the preform mold 71 in the thickness direction from the upper side of the substrates, and the substrates are penetrated. Even in this second embodiment, similarly to in the first embodiment, it is also preferred to employ the method for disposing the protection plate between the stacked reinforcing fiber substrates 2 and the preform mold 71 and completely penetrating the pins 91. Further, the pin 91 is not particularly limited similarly to the needle for penetrating 81 in the first embodiment, the pin 91 may be an individual member, may be formed integrally with the preform mold 71, and a method can also be employed wherein the reinforcing fiber substrates 2 are stacked while being penetrated by pins 91 at the stacking step, and further, a method may be employed wherein the pins are formed integrally with the pressing plate 9 placed on the stacked reinforcing fiber substrates 2 and the pins 91 are penetrated when the pressing plate 9 is disposed. In the process for producing a preform according to the present invention, a method may be employed wherein the length of the pin 91 is set at a length corresponding to a plate thickness T1 of a preform having a desired volume content of reinforcing fibers Vpf and the plate thickness of the preform 1 is controlled. Within a thickness TL of the stacked body, the reinforcing fiber substrates 2 corresponding to a length TP of the pin 91, which corresponds to a plate thickness of a desired preform, are penetrated by the pin 91 (in most cases, TL≧TP).

(H) Heating Step:

Next, the stacked body placed on the preform mold 71 and penetrated by the pins 91 is covered with the bagging material 7 and the outer circumferential portion is closed by a sealant 5. By reducing the pressure in the bagging material 7 by the vacuum pump 6 communicated with the preform 1 through a bleeding material 8, an atmospheric pressure is loaded to the preform 1 by the pressure difference between the inside and the outside of the bagging material 7. Next, by heating the stacked body by, for example, hot air, the resin material 3 mainly made of a thermoplastic resin is softened, the thickness of the preform 1 is decreased, and the respective layers including the reinforcing fiber substrates 2 and the resin material 3 are partially bonded to each other.

By heating/pressing the stacked body, the resin material 3 made of a thermoplastic resin is softened or plasticized, and the plate thickness of the stacked body is decreased by the pressure. The pins 91 penetrate the remaining reinforcing fiber substrates 2 of the stacked body, and when the thickness of the stacked body becomes TP, the preform mold 71 and the pressing plate 92 are bridged to each other by the pins 91 and the decrease of the plate thickness stops.

Where, although the shape of the pin is not particularly limited, it is preferred to set it at a condition similar to that in the aforementioned needle for penetrating.

(I) Cooling Step:

Next, the stacked body is cooled when the stacked body becomes a required thickness at the above-described heating step, the resin material 3 is solidified, and the reinforcing fiber substrates 2 are fixed.

(J) Removing Step:

Next, by removing the pressing plate 92 and the pins 91 the stacked body whose reinforcing fiber substrates 2 have been fixed, together with the bagging material 7, a preform, which has through holes and whose TP is controlled at a high accuracy, can be obtained.

Further, in reinforcing fiber substrates 2 each formed by reinforcing fiber yarns having a resin material 3 whose main component is a thermoplastic resin, because the thermoplastic particles are not plasticized and the reinforcing fibers are not bonded to each other in a condition of a stacked body at a room temperature, in a case where the stacked body is moved, etc., there is a case where the substrates slip relatively to each other and the shape of the stacked body cannot be kept. In the process for production according to the present invention, however, by penetrating the pins 91 into the stacked body, a new advantage of a function for holding the shape of the stacked body can be obtained.

Further, although, in a case of a substrate with no resin material and in a case of a small hole, the hole is closed by the spring back of the fibers, in this embodiment, by utilizing a shape keeping function due to the bonding by the resin material, even if the hole is small, an advantage, that the shape of the hole can be kept enough, can be obtained. In particular, in the production process according to the steps (F) to (J), because, while the pins 91 are left in the preform 1, the resin material whose main component is a thermoplastic resin is plasticized by heating, and thereafter, the substrates are fixed by the resin material by cooling them as they are, even if the holes are small, the holes are maintained even after the pins 91 are removed.

Namely, although a reduction of strength occurs when molded to an FRP in the conventional technology, in the preform according to the present invention, by forming the through holes with a size which does not affect the strength, a preform, having holes with a size enough for the flow path of resin and causing no reduction of strength, can be realized.

Next, a process for producing an FRP according to an embodiment of the present invention using the above-described preform according to the present invention will be explained, referring to a figure.

Figure 10:
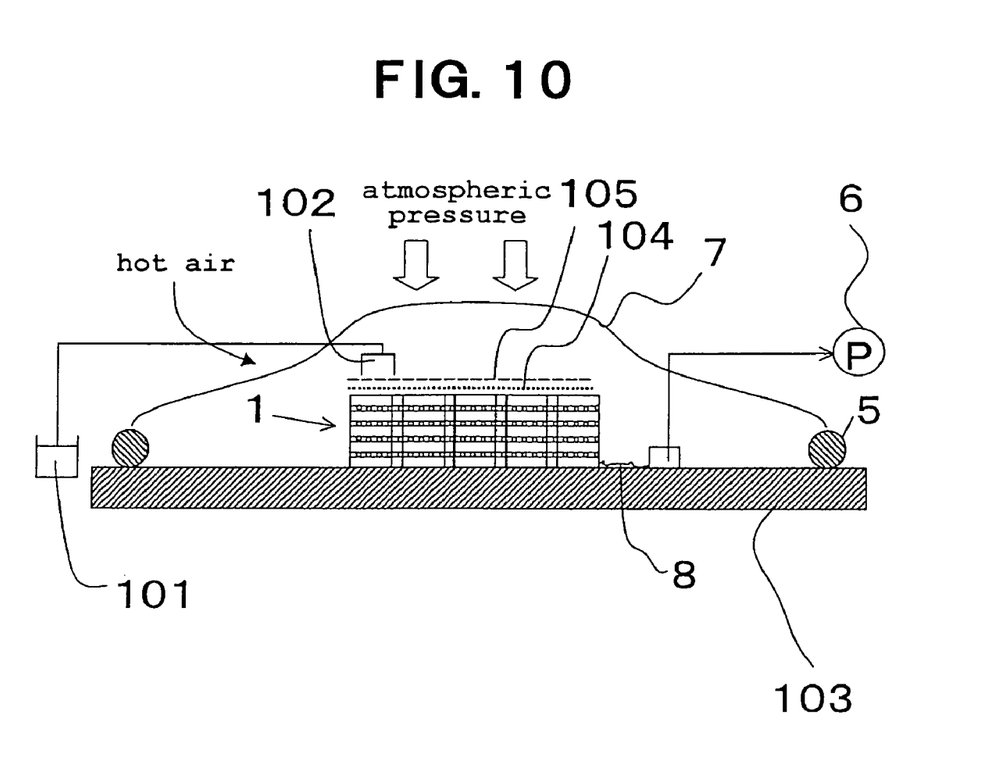
FIG. 10 is a schematic vertical sectional view of the apparatus, showing an example of a next step following the step depicted in FIG. 7 or 9.

FIG. 10 is a sectional view showing a process for producing an FRP according to an embodiment of the present invention, and shows an aspect of molding by injecting a matrix resin into the aforementioned preform 1 according to the present invention. It will be schematically explained. First, at a setting step (K), the preform according to the present invention is disposed on a mold 103. Next, at an injecting step (L), a liquefied matrix resin is injected into the mold 103 and the matrix resin is impregnated into the preform 1. Further, at a curing step (M), the matrix resin is cured. Hereinafter, each step will be explained.

(K) Setting Step:

First, as shown in FIG. 10, the preform 1 according to the present invention is placed on the mold 103. Next, a resin distributing medium 105 is disposed on at least the outermost surface of the preform 1, and a peel ply 104 is disposed between the preform 1 and the resin distributing medium 105 so that the resin distributing medium 105 can be easily separated after molding. Next, a resin pot 101 and the resin distributing medium 105 are communicated with each other via a resin injection port 102, and at the other side, the preform 1 and the vacuum pump 6 are communicated with each other via the bleeding material 8. Next, the whole is covered with the bagging material 7, and the circumferential portion is enclosed by the sealant.

Where, the mold 103 may be structured from at least one of a male mold and a female mold and the bagging material. In a case where the bagging material 7 is used, the cost of the mold 103 can be reduced, and the cost of the process for molding can be reduced.

Further, the mold 103 may be formed from two parts including a male mold and a female mold, and in such a structure, because a pressure more than an atmospheric pressure can be applied at the time of injecting the matrix resin, a short-cycle molding becomes possible.

(L) Injecting Step:

Next, the inside of the bagging material 7 is degasified by the vacuum pump 6, a matrix resin 101 is injected while the vacuum condition is maintained, first, the matrix resin is preferentially impregnated into the resin distributing medium 105, and successively impregnated in the plate thickness direction through the through holes 4 of the preform 1, and thereafter, the resin is distributed in the plane direction of the respective reinforcing fiber layers 2 (into the interlaminar portions) and the resin is impregnated into the whole of the preform 1.

As the resin distributing medium 105, for example, it is preferred to use a mesh, a wire net, etc., and it is preferred to insert a peel ply 104 (for example, a nylon taffeta) between the resin distributing medium 105 and the preform 1 so that the resin distributing medium 105 can be easily separated from an FRP after molding.

(M) Curing Step:

Next, the matrix resin is cured at the curing step. Further, in the curing, heating is preferably employed in order to increase the curing efficiency. As needed, in order to ensure the curing of the matrix resin, an aftercuring step (secondary curing) for curing the resin by heating the FRP again may be applied.

Although the above-described process is the process for producing an FRP according to the present invention, in the conventional technology, the resin injection time has been very long because, after the resin is distributed into the resin distributing medium, much time is required for impregnating the resin in the plate thickness direction particularly in a case of a thick plate. In the preform according to the present invention, however, since the matrix resin quickly enters in the plate thickness direction through the through holes 4 and successively the resin is impregnated in the plane direction of the respective substrate layers, the resin can be impregnated uniformly without voids, and the total time for the impregnation can be greatly shortened (for example, 20 to 50% relative to the impregnation time in the conventional technology). Therefore, a short-time production cycle can be realized, and as compared with the conventional technology, the molding cost can be reduced in the process according to the present invention. Further, because of the quick impregnation in the plate thickness direction, the process according to the present invention can be applied to a very thick member which has been difficult to be applied with the conventional process.

Thus, by using the preform according to the present invention, since the resin is quickly impregnated through the through holes in the plate thickness direction in the injection molding of the resin which has required much time for resin impregnation in the conventional technology, it is possible to greatly shorten the total impregnation time, a short-time production cycle can be realized, and a production process cheap in molding cost can be realized. Further, because the resin can be quickly impregnated in the plate thickness direction, it becomes possible to apply the process to a very thick member which has been difficult to be applied with the conventional process.

Further, in the present invention, because there are no cutting of fibers and no reduction in strength ascribed to holes, it becomes possible to solve the problem in the conventional technology that a certain mechanical property is decreased.

Furthermore, in the above-described embodiment, since, by utilizing the form keeping function of the resin material, the shape is enough kept until the resin is impregnated even if the holes are small enough to be able to neglect the influence to the strength, the flow path of the resin can be ensured, and even if there are the through holes, a mechanical strength equal to that of a preform with no through holes can be obtained.

EXAMPLES

Hereinafter, examples of the present invention will be explained referring to the above-described figures.

Example 1

First, reinforcing fiber substrates, each cut out from a unidirectional carbon fiber woven fabric (produced by Toray Industries, Inc.) provided as a reinforcing fiber substrate 2 at a size of 150 mm×150 mm, were prepared by 64 sheets×3 sets. The woven fabric is a unidirectional woven fabric using carbon fibers T800S (produced by Toray Industries, Inc., density: 1.8 g/m$^3$) and having a weight of carbon fibers of 30 g/m$^2$, and on the surface, a particle-like resin material 3 whose main component is a thermoplastic resin is adhered beforehand. Using this, three kinds of preforms 1 were made by the following manner.

The above-described woven fabrics were stacked on a SUS flat-plane mold at a condition where the surfaces adhered with the thermoplastic resin were directed upward and at a pseudo-isotropic stacking condition of (45°/0°/−45°/90°)8s, and the stacked bodies were prepared by three sets. The volume contents of reinforcing fibers Vpf of the respective sets at this condition were as follows.

First set: 48%

Second set: 48%

Third set: 48%

The first set was enclosed by a bagging material 7 and a sealant 5, the inside was reduced in pressure by a vacuum pump 6, and it was heated in an oven at a set temperature of 80° C. for 120 minutes. Then, after it was taken out from the oven and cooled down to a room temperature, the bagging material 7 was released, and thus a preform No. 1 was obtained.

The second set was enclosed by the bagging material 7 and the sealant 5, the inside was reduced in pressure by the vacuum pump 6, and it was heated in the oven at a set temperature of 80° C. for 120 minutes. Then, after the set was taken out from the oven and cooled down to a room temperature, the bagging material 7 was released. A foam core was placed under this substrate, through holes were formed over the entire surface at a pitch of 40 mm in such a manner that a needle with a diameter of 1 mm was penetrated perpendicularly to the staking plane from the upper side and thereafter the needle was pulled out, and thus a preform No. 2 was obtained.

For the third set, a foam core was placed between the stacked substrates and the flat-plane mold, through holes were formed by pressing a metal plate with needles (diameter of needle: 1 mm, pitch of needles: 40 mm) from the upper side of the substrate, at that state the whole thereof was enclosed by the bagging material 7 and the sealant 5, the inside was reduced in pressure by the vacuum pump 6, and it was heated in the oven at a set temperature of 80° C. for 120 minutes. Then, after it was taken out from the oven and cooled down to a room temperature, the bagging material 7 was released, the plate with needles was removed, and thus a preform No. 3 was obtained.

The volume contents of reinforcing fibers Vpf of the respective preforms at this condition were as follows.
Preform No. 1: 54%
Preform No. 2: 54%
Preform No. 3: 54%

These three kinds of preforms were set at the state shown in FIG. 10, respectively. Where, an epoxy rein (initial viscosity at 80° C.: 54 mP·s) was used as the matrix resin to be injected. The resin injection port was closed by a cramp, the closed inside was reduced in pressure by the vacuum pump 6, it was deposited into the oven with a set temperature of 80° C., the cramp at the resin injection port was removed, and the resin injection was started.

Further, resin sensors for confirming the resin impregnation at the farthest portions of the through holes were disposed at the 16th, the 32nd, the 48th and the lowermost reinforcing fiber substrates 2, respectively, in the thickness direction of each preform.

As a result, in the preform No. 1, the resin did not reach the suction port even after one hour passed after the resin injection was started, and at that time, the injection port was closed and the injection was stopped. In the preforms No. 2 and No. 3, when 40 minutes passed after the resin injection was started, it was confirmed that the resin reached all of the sensors. At that time, the resin injection port was closed, the oven temperature was elevated up to 130° C. for curing the resin, and after the condition was kept for two hours, it was cooled down to a room temperature.

As to the CFRP products thus molded, there was no non-impregnation in any of the products using preforms No. 2 and No. 3, and Vf of each CFRP was as follows.
CFRP using preform No. 2: 55%
CFRP using preform No. 3: 55%

INDUSTRIAL APPLICATIONS OF THE INVENTION

The present invention is suitably applied to a preform used for manufacturing an FRP structural body of transportation means of an airplane, an automobile or a ship, from the viewpoint of exhibiting the characteristic more effectively. However, the present invention can be applied to other uses for manufacturing FRP members broadly in various industrial fields, sport fields, etc.

The invention claimed is:

1. A process for producing an FRP comprising;
a stacking step of stacking a plurality of reinforcing fiber substrates, each reinforcing fiber substrate made of at least reinforcing fiber yarns and a thermoplastic resin material on a surface of the substrate, in a preform mold to form a stacked body,
a bonding step of at least partially bonding the plurality of reinforcing fiber substrates to each other, and
a penetrating step of forming through holes which extend through a plurality of the reinforcing fiber substrates which are partially bonded to each other in a thickness direction of the stacked body with a needle or a pin having a length of its short axis of 0.1 to 3 mm, wherein substantially no cut end of reinforcing fiber filament exists in said through holes, and wherein the content of the thermoplastic resin material is in a range of 1 to 20 wt. % relative to the stacked body;
a removing step for removing paid needle or said pin;
a disposing step of disposing said stacked body in a mold;
an injection step of injecting a thermosetting liquified matrix resin into said mold to impregnate said matrix resin into said preform, wherein the thermosetting liquified matrix resin is impregnated through the through holes, the shape of which is maintained by the thermoplastic resin material, and the thermosetting liquified matrix resin is distributed in the plane direction of the respective reinforcing fiber layers; and
a curing step for curing said matrix resin with heat to form the FRP;
wherein said removing step is carried out before said injection step.

2. The process for producing an FRP according to claim 1, wherein said FRP is produced by at least the following steps (A) to (E) carried out in order:
(A) the stacking step of stacking a plurality of reinforcing fiber substrates, each reinforcing fiber substrate made of at least reinforcing fiber yarns and thermoplastic resin material on a surface of the substrate, in a preform mold;
(B) the disposing step of disposing a stacked body, formed by said stacking step, in a mold;
(C) a heating step for heating said stacked body and bonding respective layers, each comprising the reinforcing fiber substrate and thermoplastic resin material, at least partially;
(D) a cooling step for cooling said stacked body; and
(E) the penetrating step for forming through holes which extend through a plurality of said reinforcing fiber substrates in a thickness direction of said stacked body.

3. The process for producing an FRP according to claim 1, wherein said FRP is produced by at least the following steps (F) to (K) carried out in order:
(F) the stacking step of stacking a plurality of reinforcing fiber substrates, each reinforcing fiber substrate made of at least reinforcing fiber yarns and a thermoplastic resin material on a surface of the reinforcing fiber substrate, in a preform mold;
(G) the penetrating step of penetrating a plurality of said reinforcing fiber substrates with a needle or a pin in a thickness direction of the stacked body formed by said stacking step;
(H) the disposing step for disposing said stacked body in a mold;
(I) a heating step for heating said stacked body and bonding respective layers, each comprising the reinforcing fiber substrate and the resin material, at least partially;
(J) a cooling step for cooling said stacked body; and
(K) the removing step for removing said needle or said pin.

4. The process for producing an FRP according to claim 1, wherein, in said step of disposing said stacked body in a mold, said mold is formed by at least a female mold or a male mold and a bagging material.

5. The process for producing an FRP according to claim 1, wherein, in said step of disposing said stacked body in a mold, a resin distributing medium is stacked on an outermost surface of said stacked body, and in said injecting step, after said matrix resin is preferentially injected into said resin distributing medium, the resin is impregnated in a thickness direction of said stacked body through said through holes, the resin is impregnated in a plane direction of said stacked body from said through holes, and the resin is thus impregnated over the entire stacked body.

* * * * *